E. W. Skinner,
Harvester Rake.

No. 100,200. Patented Feb. 22, 1870.

Witnesses
R. D. Smith
C. A. Harkness

Inventor.
E. W. Skinner
By Farwell, Cresswell & Co.
Attorneys

United States Patent Office.

E. W. SKINNER, OF MADISON, WISCONSIN.

Letters Patent No. 100,200, dated February 22, 1870.

IMPROVEMENT IN HARVESTER-RAKES.

The Schedule referred to in these Letters Patent and making part of the same.

*To all whom it may concern:*

Be it known that I, E. W. SKINNER, of Madison, in the county of Dane, and State of Wisconsin, have invented certain new and useful Improvements in Harvester-Rakes; and I do hereby declare the following to be a full, clear, and exact description thereof, which will enable others skilled in the art to which my invention appertains to make and use the same, reference being had to the accompanying drawings forming part of this specification, in which—

Similar letters of reference indicate corresponding parts in the several figures of the drawings.

My invention relates to harvester-rakes, and has for its object to render them more efficient in their operation.

To this end it consists, first, of an adjustable track, in combination with a reciprocating rake and its arm, for the purpose of regulating the position and inclination of the rake teeth with relation to the apron of the machine.

It also consists in the combination of the weight applied to the rake and the slotted sleeve upon the rake-arm, so that, while the rake is being moved back and forth upon the machine, it shall also be capable of being elevated or thrown down upon the apron, and, when elevated, prevented from being thrown too far back by the action of the weight.

In the accompanying drawings—

A is the harvester-frame mounted upon the wheels B B', and provided with the apron C in the usual manner.

Figure 1:
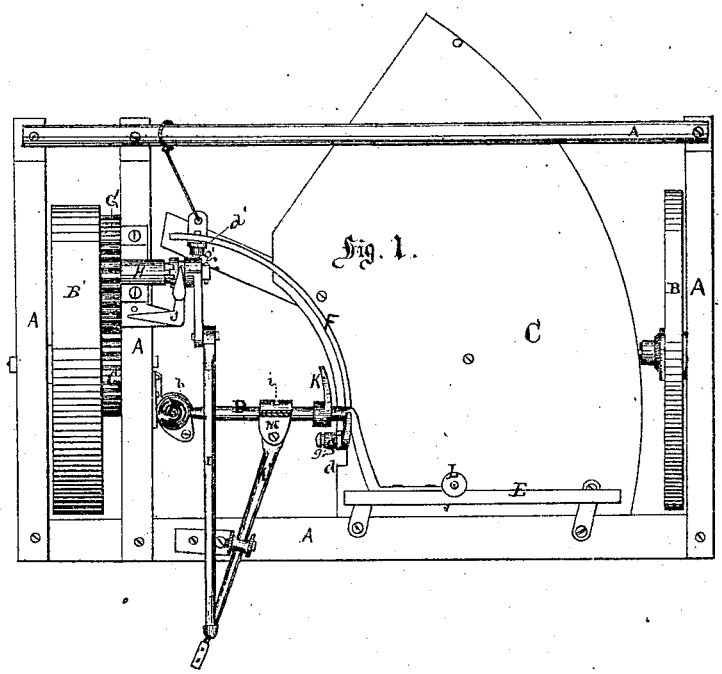
Figure 1 is a top plan view of a harvester, showing my improvements applied thereto.
Figure 2:
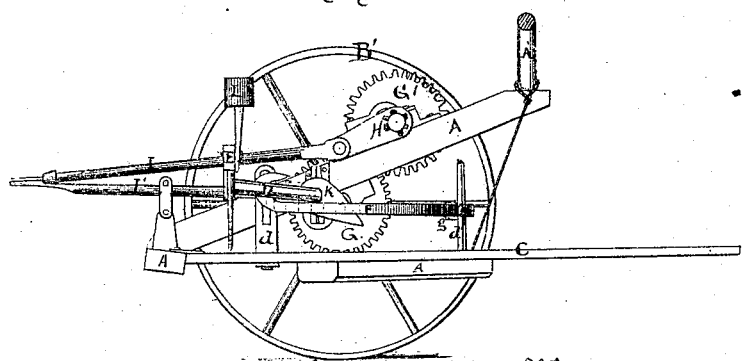
Figure 2 is an end elevation of the same.
Figure 3:
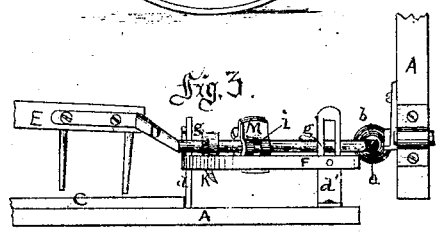
Figure 3 is a detached view of the rake-arm and its connections.

D is the angular rake-arm, whose inner end is provided with a ball, *a*, shown in fig. 3, which is held between two hemispherical cases, *b b*, attached to the frame.

The two proximate edges of the cases *b b* are cut away upon one side to permit the lateral movement of the rake-arm.

By this construction a universal joint is formed, which permits the rake-arm to rotate while it is being moved forward and back over the machine.

E is the rake head firmly secured to the arm D, as shown.

F is a curved track situated at the inner side of the apron, for the purpose of supporting and guiding the rake in its movements.

This track is made adjustable, by means of set-screws or by other proper means, in the slotted standards *d d'* affixed to the frame. By the adjustability of the track the position of the rake is determined with reference to the apron, so that it shall rest level or evenly upon the apron, and also compensate for the wear of the rake-teeth. By this means also the angle which the rake-teeth presents to the platform when passing over it, may be adjusted as desired without affecting the operative parts of the rake.

This adjustment is necessary to permit of the rake-teeth being thrown into the requisite position with relation to the cutter-bar for properly forming a gavel.

Motion is communicated to the rake and its arm from the driving-wheel B', through the medium of the gear-wheels G G', crank-shaft H, and jointed connecting-rods I I', as shown.

The inner end of the crank-shaft is provided with a clutch, which is operated by the bell-crank J, to throw the mechanism for operating the rake in and out of gear.

K is a cam firmly secured to the rake-arm D, and is adapted to throw the rake up and down in the following manner:

The rake, being elevated and moving across the machine, is thrown down upon the apron to rake the grain therefrom, by the cam K striking against the roller *g* attached to the slotted standard *d* which supports the curved track. After moving across the apron to form the gavel, the rake is again elevated by the cam K coming in contact with the roller *g'* upon the slotted standard *d'*. By this construction the rollers lying in the path of the cam act upon the latter, and alternately elevate and depress the rake as the latter moves across the apron.

L is a weight attached to the rake-head or its arm in front of the center of the same, so that when the rake is carrying the cut grain off the apron it shall be held firmly in the grain.

When the rake is raised by the action of the cam upon the roller *d'*, the weight holds it in an elevated position to prevent its falling down upon the grain until the cam shall come in contact with the roller *d*. Owing to this arrangement the rake is held securely in an elevated or depressed position.

Placed upon the rake-arm between the cam K and universal joint is a sleeve, M, which is also pivoted to the connecting-rod I', by which the rake is moved back and forth across the machine.

The sleeve is slotted upon one side, and through the slot projects a pin, *i*, affixed to the rake-arm. This pin, coming in contact with the lower end of the slot when the rake is elevated, prevents the latter from tipping back too far under the action of the weight L. It also prevents the lateral play of the sleeve upon the rake-arm.

By my improvements harvester-rakes are rendered much more efficient than they have been heretofore.

Having thus described my invention,

What I claim as new, and desire to secure by Letters Patent, is—

1. The adjustable segmental guide-track F, in combination with the bent-armed reciprocating rake E D, for the purpose of regulating the position and inclination of the rake-teeth with relation to the apron of the machine, substantially as described.

2. The combination of the weight L and slotted sleeve M with the rake and its arm, for the purpose specified.

3. In combination with the harvester-rake E D, the universal joint and adjustable track F, for the purpose specified.

E. W. SKINNER.

Witnesses:
CHANDLER P. CHAPMAN,
HENRY HOWARTH.